(12) United States Patent
Shibata

(10) Patent No.: US 9,515,525 B2
(45) Date of Patent: *Dec. 6, 2016

(54) ELECTRIC MOTOR

(71) Applicant: JTEKT CORPORATION, Osaka-shi, Osaka (JP)

(72) Inventor: Yoshiyuki Shibata, Toyota (JP)

(73) Assignee: JTEKT CORPORATION, Osaka (JP)

( * ) Notice: Subject to any disclaimer, the term of this patent is extended or adjusted under 35 U.S.C. 154(b) by 749 days.

This patent is subject to a terminal disclaimer.

(21) Appl. No.: 13/940,529

(22) Filed: Jul. 12, 2013

(65) Prior Publication Data

US 2014/0021818 A1  Jan. 23, 2014

(30) Foreign Application Priority Data

Jul. 23, 2012  (JP) ................................ 2012-162935

(51) Int. Cl.
  *H02K 21/14*  (2006.01)
  *H02K 1/27*  (2006.01)
  *H02K 21/04*  (2006.01)

(52) U.S. Cl.
  CPC .......... *H02K 1/2713* (2013.01); *H02K 21/046* (2013.01); *H02K 21/14* (2013.01); *H02K 1/2766* (2013.01); *H02K 1/2773* (2013.01)

(58) Field of Classification Search
  CPC ............................ H02K 21/046; H02K 21/014
  See application file for complete search history.

(56) References Cited

U.S. PATENT DOCUMENTS

| 3,411,027 A | * | 11/1968 | Rosenberg | ............. | H02K 19/26 |
| | | | | | 310/156.49 |
| 4,757,224 A | * | 7/1988 | McGee | ................... | H02K 21/44 |
| | | | | | 310/111 |

(Continued)

FOREIGN PATENT DOCUMENTS

| JP | A-2010-233346 | 10/2010 |
| JP | 2011-067048 A | 3/2011 |

(Continued)

OTHER PUBLICATIONS

Jul. 7, 2015 Extended Search Report issued in European Application No. 13177223.8.

(Continued)

*Primary Examiner* — Dang Le
(74) *Attorney, Agent, or Firm* — Oliff PLC

(57) ABSTRACT

An electric motor has a supplementary field magnet including a magnetization coil, a yoke serving as a magnetic path for magnetic flux produced by the magnetization coil, and a variable magnet. The supplementary field magnet is arranged on one axial end side of the rotor with a gap. A rotor core is provided with first projections projecting toward one axial end side of the electric motor from first magnetic pole portions, and second projections projecting toward the one axial end side from second magnetic pole portions and arranged radially inward of the first projections. The yoke includes an outer magnetic pole portion axially opposed to the first projections, and an inner magnetic pole portion axially opposed to the second projections such that an annular gap is formed between the inner magnetic pole portion and the outer magnetic pole portion.

3 Claims, 6 Drawing Sheets

(56) References Cited

U.S. PATENT DOCUMENTS

| | | | | |
|---|---|---|---|---|
| 6,462,449 B1 * | 10/2002 | Lucidarme | ............ | H02K 1/2706 |
| | | | | 310/156.56 |
| 6,900,570 B2 * | 5/2005 | Ifrim | ....................... | H02P 9/302 |
| | | | | 310/180 |
| 7,057,323 B2 * | 6/2006 | Horst | ..................... | H02K 21/16 |
| | | | | 310/191 |
| 2004/0189132 A1 | 9/2004 | Horst | | |
| 2008/0036331 A1 | 2/2008 | Mizutani et al. | | |
| 2009/0295249 A1 | 12/2009 | Kinjou et al. | | |

FOREIGN PATENT DOCUMENTS

| | | |
|---|---|---|
| JP | 2011-182622 A | 9/2011 |
| WO | 01/42649 A2 | 6/2001 |

OTHER PUBLICATIONS

Jul. 7, 2015 Extended Search Report in European Patent Application No. 13177224.6.
May 5, 2016 Office Action issued in U.S. Appl. No. 13/940,518.
Jul. 7, 2015 Extended Search Report issued in European Application No. 13 17 7223.
Jul. 14, 2016 US Office Action Issued in U.S. Appl. No. 13/940,518.

* cited by examiner

ELECTRIC MOTOR

INCORPORATION BY REFERENCE/RELATED APPLICATION

This application claims priority to Japanese Patent Application No. 2012-162935 filed on Jul. 23, 2012 the disclosure of which, including the specification, drawings and abstract, is incorporated herein by reference in its entirety.

BACKGROUND OF THE INVENTION

1. Field of the Invention

The invention relates to an electric motor.

2. Discussion of Background

Conventionally, there has been an electric motor that includes a so-called "embedded magnet rotor" in which permanent magnets are embedded in a rotor core so that the permanent magnets are fixed to the rotor core (for example, Japanese Patent Application Publication No. 2010-233346 (JP 2010-233346 A)). Generally, in such a permanent magnet electric motor having permanent magnets in a rotor, magnetic flux produced by the permanent magnets is constant. Therefore, an induced voltage (a counter-electromotive voltage) generated in a coil of a stator is increased in proportion to a rotation speed of the rotor. Then, once the induced voltage reaches an upper limit of a power-supply voltage, it is no longer possible to rotate the rotor at a higher speed. Thus, a design may be employed, which restricts an amount of magnetic flux produced by the permanent magnets to an amount at which the rotor is allowed to rotate at a sufficiently high speed. However, in this case, there is a possibility that torque will be insufficient in a low-speed rotation region.

In recent years, an electric motor has been proposed, which includes a housing (a magnetic field yoke) having a tubular portion and a top plate portion provided at an open end of the tubular portion, a stator fixed to an inner periphery of the tubular portion, and a rotor arranged radially inward of the stator, and in which a field coil that is wound along the circumferential direction of the electric motor is fixed to the top plate portion such that the field coil faces the rotor in the axial direction of the electric motor (for example, US 2008/0036331 A1). The electric motor is structured such that magnetic flux produced by the field coil passes through the top plate portion of the housing, the rotor, the stator, and the tubular portion of the housing. Further, by changing a direction of magnetic flux that is produced by the field coil, it is possible to adjust an amount of magnetic flux that is transmitted between the stator and the rotor (a magnetic flux density on an outer periphery of a rotor core). By producing, in the field coil, magnetic flux that reduces an amount of magnetic flux that is transmitted between the stator and the rotor, it becomes possible to suppress an increase in an induced voltage and allow the rotor to rotate at a high speed. In addition, by producing, in the field coil, magnetic flux that increases the amount of the magnetic flux, it becomes possible to generate high torque in a low-speed rotation region.

In the structure described in US 2008/0036331 A1, the housing serves as a magnetic path for magnetic flux produced by the field coil. Therefore, if a thickness of the housing is reduced, magnetic resistance of the magnetic path increases. If magnetic resistance becomes excessive, it may no longer be possible to sufficiently adjust an amount of magnetic flux that is transmitted between the stator and the rotor on the basis of the magnetic flux produced by the field coil. Therefore, it is difficult to reduce the size of an electric motor.

SUMMARY OF THE INVENTION

The invention provides a compact electric motor that is able to rotate at a high speed and is also able to output high torque in a low-speed rotation region.

According to a feature of an example of the invention, there is provided an electric motor, including: a housing having a tubular portion; a stator fixed to an inner periphery of the tubular portion; and a rotor arranged radially inward of the stator, and having a rotor core and a plurality of embedded magnets that are embedded in the rotor core so as to be fixed to the rotor core, the embedded magnets being arranged such that a magnetic pole with a first polarity and a magnetic pole with a second polarity are arranged alternately in a circumferential direction on an outer periphery of the rotor, wherein the rotor core is provided with a first projection that projects toward at least one axial side of the electric motor from a first magnetic pole portion of the rotor core, in which the magnetic pole with the first polarity appears in the outer periphery, and a second projection that projects toward at least one axial side of the electric motor from a second magnetic pole portion of the rotor core, in which the magnetic pole with the second polarity appears in the outer periphery, the second projection being arranged radially inward of the first projection, on at least one axial side of the rotor, a supplementary field magnet is arranged, which has a coil that is wound in the circumferential direction, and a yoke that serves as a magnetic path for magnetic flux produced by the coil, and the supplementary field magnet includes an outer magnetic pole portion that faces the first projection in an axial direction, and an inner magnetic pole portion that faces the second projection in the axial direction such that a gap is formed between the inner magnetic pole portion and the outer magnetic pole portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
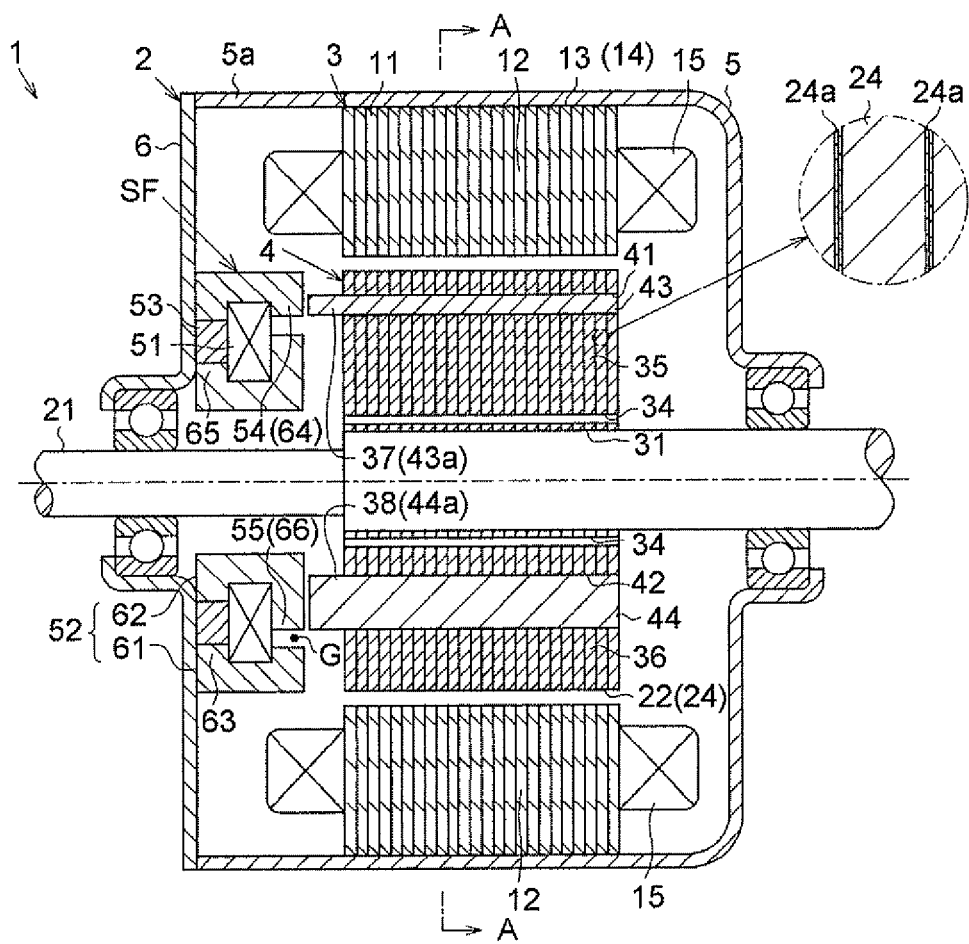
FIG. 1 is a sectional view of an electric motor according to a first embodiment of the invention, taken along the axial direction of the electric motor.
Figure 2:
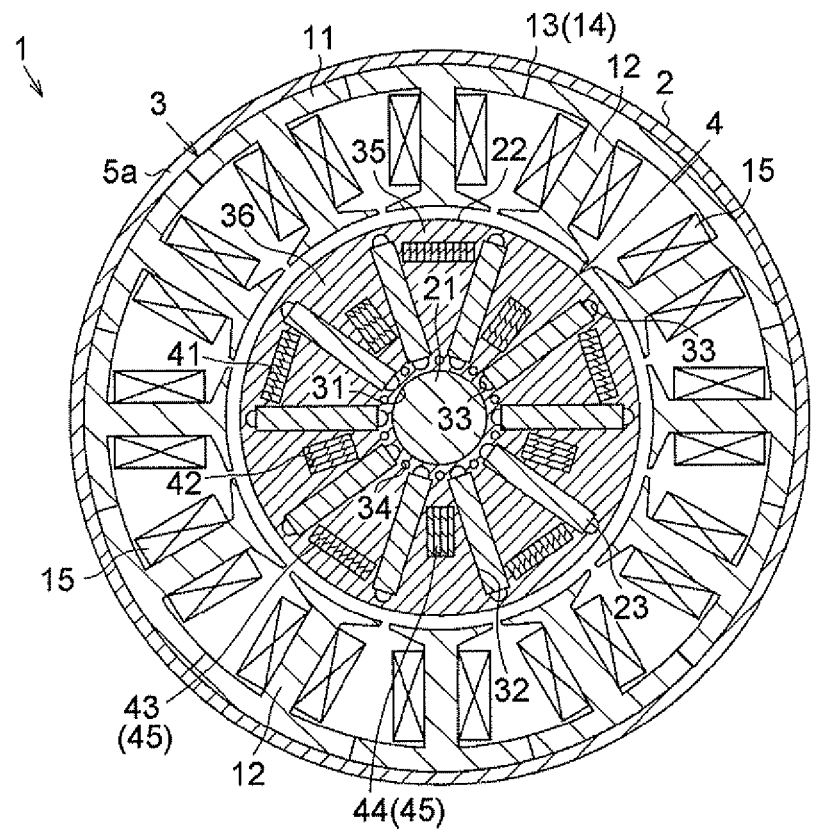
FIG. 2 is a sectional view taken along the line A-A in FIG. 1.

A first embodiment of the invention will be described with reference to the accompanying drawings. An electric motor 1 shown in FIG. 1 and FIG. 2 is used as a drive source of, for example, an electric vehicle or a hybrid vehicle. As shown in FIG. 1 and FIG. 2, the electric motor 1 includes a stator 3 housed in a cylindrical housing 2, and a rotor 4 that is rotatably supported at a position radially inward of the stator 3. The housing 2 is formed of a bottomed cylindrical housing body 5 that is open at one end side (the left side in FIG. 1), and an annular cover 6 provided so as to close the open end of the housing body 5. In the present embodiment, the housing body 5 and the cover 6 are made of a non-magnetic material.

The stator 3 has a stator core 13 formed of a cylindrical portion 11 having a cylindrical shape and fixed to an inner periphery of a tubular portion 5a of the housing body 5, and a plurality of (in the present embodiment, twelve) teeth 12 extending radially inward from the cylindrical portion 11. The stator core 13 is formed by laminating a plurality of magnetic steel sheets 14 such as silicon steel sheets. Multiple (in the present embodiment, twelve) stator coils 15 are wound around the respective teeth 12.

The rotor 4 includes a rotary shaft 21, a columnar rotor core 22 that is fixed to the rotary shaft 21 so as to be rotatable together with the rotary shaft 21, and a plurality of (in the present embodiment, ten) embedded magnets 23 that are embedded in and thus fixed to the rotor core 22. In other words, the rotor 4 according to the present embodiment is structured as a so-called "embedded magnet rotor". The rotary shaft 21 is made of a metal material, and the rotor core 22 is formed by laminating a plurality of magnetic steel sheets 24. As shown in an enlarged view in FIG. 1, insulating films 24a are provided on surfaces of the magnetic steel sheets 24. Thus, in the rotor core 22, magnetic resistance in the axial direction is larger than magnetic resistance in the radial direction.

In the electric motor 1 structured as described above, when three-phase excitation currents are supplied from a control device (not shown) to the stator coils 15, a rotating magnetic field is generated in the stator 3, and the rotor 4 rotates on the basis of the rotating magnetic field.

In the electric motor 1 in the present embodiment, a supplementary field magnet SF is provided on one axial end side (the left side in FIG. 1) of the rotor 4 so as to be apart from the rotor 4. When magnetic flux produced by the supplementary field magnet SF passes through the rotor 4, an amount of magnetic flux that is transmitted between the stator 3 and the rotor 4 is adjusted. A structure for adjusting magnetic flux that is transmitted between the stator 3 and the rotor 4 will be described below.

Figure 3:
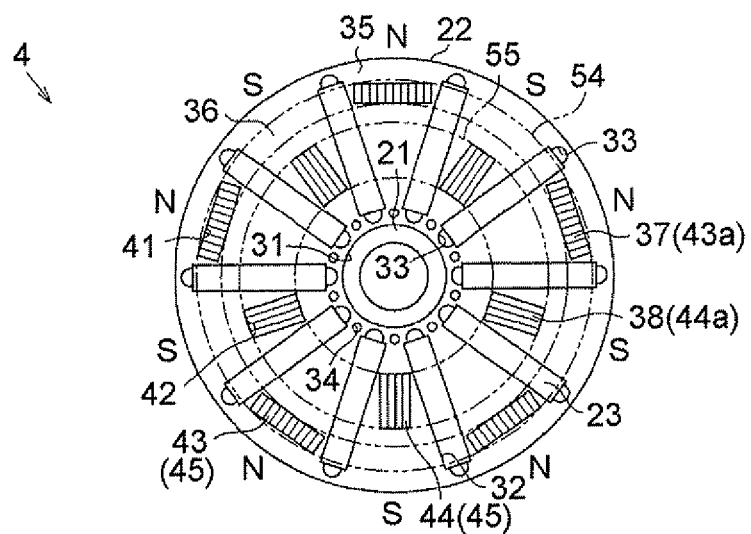
FIG. 3 is a side view of a rotor according to the first embodiment, seen from one axial end side of the electric motor.

First, a structure of the rotor will be described in detail. As shown in FIG. 2 and FIG. 3, a through-hole 31, through which the rotary shaft 21 is passed, is formed at the center of in the rotor core 22. The rotor core 22 has a plurality of hollow portions 32 in which the embedded magnets 23 are arranged. The hollow portions 32 are each formed into a hole having a rectangular sectional shape and extending in the axial direction, and are arranged in the rotor core 22 such that the longitudinal direction of the rectangular sectional shape coincides with the radial direction of the electric motor 1. On each of both radial sides of each hollow portion 32, a bulged portion 33 is formed, which has a generally semicircular sectional shape and is continuous with the hollow portion 32. In a radially inner side portion of the rotor core 22, a plurality of voids 34 is formed. Each of the voids 34 in the present embodiment is formed to have a generally circular sectional shape, extends in the axial direction, and is arranged between the adjacent bulged portions 33.

The embedded magnets 23 are each formed into a flat-plate shape having a rectangular sectional shape corresponding to the sectional shape of the hollow portion 32, and are arranged inside the respective hollow portions 32. In short, the embedded magnets 23 are arranged in a radial fashion. The embedded magnets 23 are magnetized such that portions having the same polarity (the north pole or the south pole) face each other in the circumferential direction, and polarities of magnetic poles (rotor magnetic poles), which are formed on an outer periphery of the rotor core 22 by the embedded magnets 23, are arranged such that the north poles and the south poles are arranged alternately in the circumferential direction. Therefore, among a plurality of generally sector portions of the rotor core 22, which are located between the adjacent hollow portions 32, the sector portions where a magnetic pole with a first polarity (in the present embodiment, the north pole) appears on the outer periphery are formed as first magnetic pole portions 35, and the portions where a magnetic pole with a second polarity (in the present embodiment, the south pole) appears on the outer periphery are formed as second magnetic pole portions 36. Magnetic flux produced by the embedded magnets 23 is inhibited from passing through the radially outer side of the embedded magnets 23 by the bulged portions 33 arranged radially outward of the embedded magnets 23, and also inhibited from passing through the radially inner side of the embedded magnets 23 by the bulged portions 33 and the voids 34 arranged radially inward of the embedded magnets 23. As the embedded magnets 23 in the present embodiment, for example, ferrite-based bonded magnets (e.g. plastic magnets, rubber magnets) are used.

As shown in FIG. 1 to FIG. 3, the rotor core 22 has first projections 37 that project towards one axial end side of the electric motor 1 from the first magnetic pole portions 35, and second projections 38 that project towards the one axial end side of the electric motor 1 from the second magnetic pole portions 36 and are arranged radially inward of the first projections 37.

Specifically, first insertion holes 41, which pass through the rotor core 22 in the axial direction, are formed in radially outer side portions of the first magnetic pole portions 35, and second insertion holes 42, which pass through the rotor core 22 in the axial direction, are formed in radially inner side portions of the second magnetic pole portions 36. A radial range in which the first insertion holes 41 are formed, and a radial range in which the second insertion holes 42 are formed, are arranged so as not to overlap each other in the circumferential direction. The first insertion holes 41 are each formed to have a rectangular sectional shape such that the longitudinal direction of the rectangular sectional shape is perpendicular to the radial direction of the electric motor 1. The second insertion holes 42 are each formed to have a rectangular sectional shape such that the longitudinal direction of the rectangular sectional shape extends along the radial direction of the electric motor 1. Each first insertion hole 41 and each second insertion hole 42 are formed such that the sectional area of the first insertion hole 41 and the sectional area of the second insertion hole 42 are substantially equal to each other.

Elongate first magnetic bodies 43 and elongate second magnetic bodies 44 are inserted in the first insertion holes 41 and the second insertion holes 42, respectively. The first magnetic bodies 43 are each formed to have a rectangular sectional shape corresponding to the sectional shape of each of the first insertion holes 41, and the sectional area of each first magnetic body 43 is substantially constant throughout the entirety of the first magnetic body 43 in the axial direction. Meanwhile, the second magnetic bodies 44 are each formed to have a rectangular sectional shape corresponding to the sectional shape of each of the second insertion holes 42, and the sectional area of each second magnetic body 44 is substantially constant throughout the entirety of the second magnetic body 44 in the axial direction. Each first magnetic body 43 and each second magnetic body 44 are formed such that the sectional area of the first magnetic body 43 and the sectional area of the second magnetic body 44 are substantially equal to each other. Each of the first magnetic bodies 43 and second magnetic bodies 44 in the present embodiment are formed by laminating magnetic steel sheets 45 such as silicon steel sheets in a direction that is perpendicular to the laminating direction of the magnetic steel sheets 24 that constitute the rotor core 22. Thus, magnetic resistance of the first magnetic bodies 43 and the second magnetic bodies 44 in the axial direction is smaller than magnetic resistance of the rotor core 22 in the axial direction. As in the case of the magnetic steel sheets 24 of the rotor core 22, insulating films are provided on surfaces of the magnetic steel sheets 45. As shown in FIG. 1, the first magnetic bodies 43 and the second magnetic bodies 44 are each formed to be longer than the axial length of the rotor core 22, and one end portions 43a of the first magnetic bodies 43 and one end portions 44a of the second magnetic bodies 44 project beyond one axial end face of the rotor core 22 toward one axial end side of the electric motor 1. In other words, in the present embodiment, the one end portions 43a of the first magnetic bodies 43 are formed as the first projections 37, and the one end portions 44a of the second magnetic bodies 44 are formed as the second projections 38.

Next, a structure of the supplementary field magnet will be described in detail. The supplementary field magnet SF includes a magnetization coil 51 that is an annular coil formed by winding a conductive wire in the circumferential direction, an annular yoke 52 that serves as a magnetic path for magnetic flux produced by the magnetization coil 51, and an annular variable magnet 53 provided in an intermediate portion of the magnetic path for the magnetic flux produced by the magnetization coil 51. In the supplementary field magnet SF, an outer magnetic pole portion 54 is provided, which faces the first projections 37 in the axial direction, and an inner magnetic pole portion 55 is provided, which faces the second projections 38 in the axial direction such that a gap G is formed between the outer magnetic pole portion 54 and the inner magnetic pole portion 55.

Specifically, the yoke 52 includes a generally cylindrical outer member 61, and a generally cylindrical inner member 62 that is arranged radially inward of the outer member 61. The outer member 61 and the inner member 62 are each formed of a powder magnetic core. At one end portion of the outer member 61 (an end portion on the opposite side of the outer member 62 from the rotor 4), an annular fixed flange portion 63 is formed, which extends radially inward. At the other end portion of the outer member 61 (an end portion on the rotor 4 side), an annular opposed flange portion 64 is formed, which extends radially inward. The outer member 61 is arranged coaxially with the rotor 4 and fixed to the inner face of the cover 6 such that the opposed flange portion 64 is opposed to the first projections 37 in the axial direction. In other words, in the present embodiment, the opposed flange portion 64 is formed as the outer magnetic pole portion 54. Meanwhile, at one end portion of the inner member 62, an annular fixed flange portion 65 is formed, which extends radially outward. At the other end portion of the inner member 62, an annular opposed flange portion 66 is formed, which extends radially outward. The inner member 62 is arranged coaxially with the rotor 4 and fixed to the inner face of the cover 6 such that the opposed flange portion 66 is opposed to the second projections 38 in the axial direction. In other words, in the present embodiment, the opposed flange portion 66 is formed as the inner magnetic pole portion 55.

The outer member 61 and the inner member 62 are fixed to the cover 6 so as to be apart from each other in the radial direction. Thus, the gap G is formed between the opposed flange portion 64 (the outer magnetic pole portion 54) and the opposed flange portion 66 (the inner magnetic pole portion 55). A radial width of the gap G is set larger than each of both an axial clearance between the opposed flange portion 64 and each first projection 37, and an axial clearance between the opposed flange portion 66 and each second projection 38. A radial width of each opposed flange portion 64 and a radial width of each opposed flange portion 66 are set such that the opposed flange portion 64 and the opposed flange portion 66 face the entirety of one end face of each first projection 37 and the entirety of one end face of each second projection 38, respectively (see FIG. 3).

The magnetization coil 51 is fixed between an axial center portion of the outer member 61 and an axial center portion of the inner member 62, such that the magnetization coil 51 is arranged coaxially with the rotor 4. Thus, the yoke 52 (the outer member 61 and the inner member 62) is included in the magnetic path for magnetic flux produced by the magnetization coil 51. The conductive wire of the magnetization coil 51 has a larger wire diameter than that of the conductive wire of the stator coil 15. The variable magnet 53 is arranged next to the magnetization coil 51 in the axial direction, at a position between the fixed flange portion 63 of the outer member 61 and the fixed flange portion 65 of the inner member 62 such that the magnetization coil 51 is located between the variable magnet 53 and the rotor 4. The variable magnet 53 and the fixed flange portions 63, 65 are in close contact with each other. The variable magnet 53 is magnetized in a direction along magnetic flux produced by the magnetization coil 51 (the radial direction, in the present embodiment). Thus, polarities corresponding to the magnetization direction of the variable magnet 53 appear in the opposed flange portion 64 that serves as the outer magnetic pole portion 54, and in the opposed flange portion 66 that serves as the inner magnetic pole portion 55. As the variable magnet 53 in the present embodiment, a magnet having a smaller magnetic coercive force than that of the embedded magnets 23, such as a samarium-cobalt-based sintered magnet, is used.

Next, operations of the supplementary field magnet in the electric motor according to the present embodiment will be described. The variable magnet 53 is demagnetized or further magnetized irreversibly, or the magnetization direction of the variable magnet 53 is changed, as a large electric current is supplied to the magnetization coil 51 from the control device and a strong magnetic field is formed. When the magnetization direction of the variable magnet 53 is changed, polarities that appear in the outer magnetic pole portion 54 and the inner magnetic pole portion 55 are changed.

Because the outer magnetic pole portion 54 faces the first projections 37, magnetic flux that passes through the outer magnetic pole portion 54 enters or exits from the first magnetic pole portions 35 of the rotor core 22 mainly through the first projections 37. Because the inner magnetic pole portion 55 faces the second projections 38, magnetic flux that passes through the inner magnetic pole portion 55 enters or exits from the second magnetic pole portions 36 of the rotor core 22 mainly through the second projections 38. Magnetic flux that is transmitted between the stator 3 and the rotor 4 is increased or decreased depending on the polarities that appear in the outer magnetic pole portion 54 and the inner magnetic pole portion 55. In other words, magnetic flux produced by the embedded magnets 23 is increased (increased magnetic flux) or reduced (reduced magnetic flux) depending on the polarities that appear in the outer magnetic pole portion 54 and the inner magnetic pole portion 55. An amount of increase (an amount of decrease) of magnetic flux that is transmitted between the stator 3 and the rotor 4 is adjusted in accordance with a degree of magnetization of the variable magnet 53.

Figure 4A:
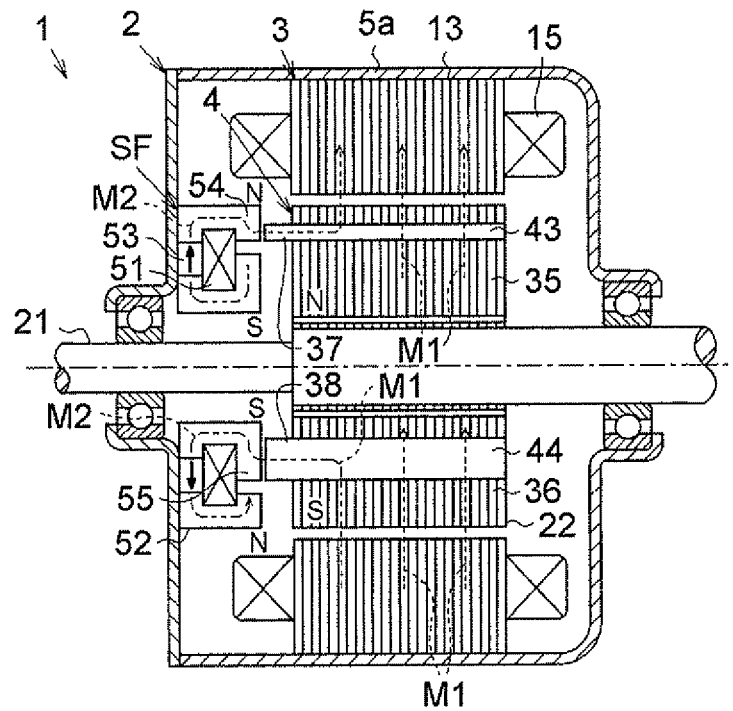
FIG. 4A and FIG. 4B are operation explanatory views showing flows of magnetic flux in the electric motor according to the first embodiment.
Figure 4B:
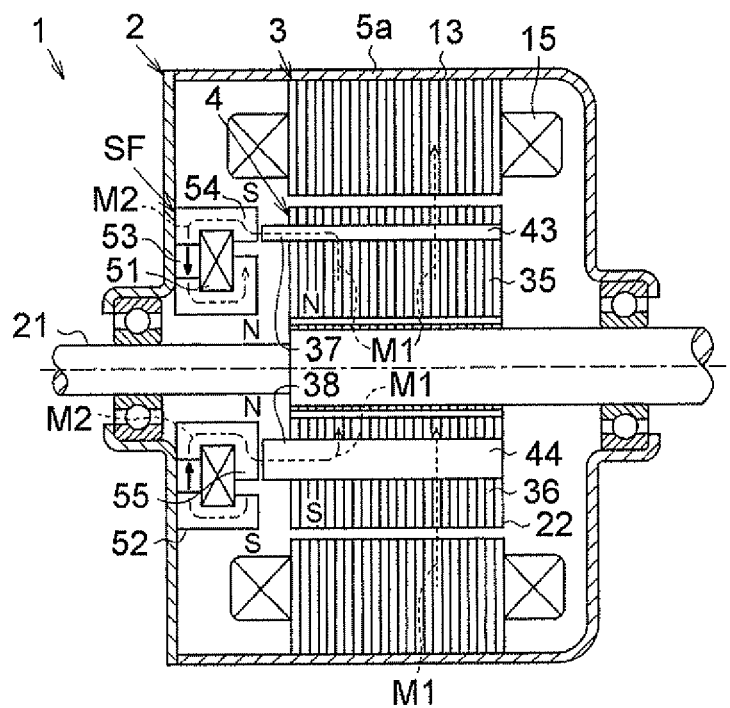

More particularly, as shown in FIG. 4A, when the first polarity (the north pole) appears in the outer magnetic pole portion 54, and the second polarity (the south pole) appears in the inner magnetic pole portion 55, the polarities of the outer magnetic pole portion 54 and the inner magnetic pole portion 55 are the same as the polarities of the first magnetic pole portions 35 and the second magnetic pole portions 36, respectively. Therefore, magnetic flux M2 of the variable magnet 53 (the supplementary field magnet SF) is added to magnetic flux M1 of the embedded magnets 23, which passes through the outer periphery of the rotor core 22. More specifically, the magnetic flux M2 from the outer magnetic pole portion 54 enters the first magnetic pole portions 35 through the first projections 37, enters the second magnetic pole portions 36 through the stator 3 like the magnetic flux M1 produced by the embedded magnets 23, and then returns to the inner magnetic pole portion 55 through the second projections 38. Thus, magnetic flux that is transmitted between the stator 3 and the rotor 4 is increased, which makes it possible to generate high torque. In FIG. 4A and FIG. 4B, the magnetization direction of the variable magnet 53 is shown by arrows.

On the other hand, as shown in FIG. 4B, when the second polarity appears in the outer magnetic pole portion 54, and the first polarity appears in the inner magnetic pole portion 55, polarities of the outer magnetic pole portion 54 and the inner magnetic pole portion 55 are opposite to the polarities of the first magnetic pole portions 35 and the second magnetic pole portions 36, respectively. Therefore, a part of the magnetic flux M1 produced by the embedded magnets 23 is drawn into the supplementary field magnet SF. More specifically, a part of the magnetic flux M1 produced by the embedded magnets 23 is drawn into the outer magnetic pole portion 54, and the magnetic flux M2 from the inner magnetic pole portion 55 enters the second magnetic pole portions 36 through the second projections 38 and is drawn into the embedded magnets 23. Thus, the magnetic flux that is transmitted between the stator 3 and the rotor 4 is reduced, which makes it possible to suppress an increase in an induced voltage, thereby allowing the rotor 4 to rotate at a high speed. The magnetic flux M2 produced by the supplementary field magnet SF enters the rotor 4 through one of the first projections 37 and the second projections 38, and exits from the rotor 4 through the other one of the first projections 37 and the second projections 38. Therefore, the magnetic flux M2 hardly passes through the tubular portion 5a of the housing 2. In other words, the tubular portion 5a does not serve as a magnetic path for the magnetic flux produced by the supplementary field magnet SF.

As described so far, the present embodiment produces the following advantageous effects.

(1) Magnetic flux that is transmitted between the stator 3 and the rotor 4 is increased or decreased by the supplementary field magnet SF that produces magnetic flux that hardly passes through the tubular portion 5a of the housing 2. Therefore, even if the thickness of the tubular portion 5a is reduced, magnetic resistance of the tubular portion 5a is not increased. Therefore, it is possible to easily reduce the size of the electric motor 1 in the radial direction.

(2) The supplementary field magnet SF includes the variable magnet 53 that is magnetized along the magnetic flux produced by the magnetization coil 51. Therefore, it is possible to increase or decrease magnetic flux that is transmitted between the stator 3 and the rotor 4 without continuously supplying an electric current to the supplementary field magnet SF.

(3) The variable magnet 53 is formed into an annular shape, and arranged next to the magnetization coil 51 in the axial direction such that the magnetization coil 51 is interposed between the variable magnet 53 and the rotor 4. Magnetic flux produced by the magnetization coil 51 enters or exits from the rotor 4 through the first projections 37 and the second projections 38. Therefore, magnetic flux, which passes through portions of the magnetic path for the magnetization coil 51, which are close to the first projections 37 and the second projections 38 (the outer magnetic pole portion 54 and the inner magnetic pole portion 55), is easily concentrated at positions opposed to the first projections 37 and the second projections 38. This means that a magnetic flux density of magnetic flux produced by the magnetization coil 51 is not uniform in the circumferential direction, and thus varies in the circumferential direction. Therefore, for example, if the variable magnet 53 is arranged near the outer magnetic pole portion 54 or the inner magnetic pole portion 55, the degree of magnetization may vary when, for example, the magnetization direction of the variable magnet 53 is changed by a strong magnetic field that is formed by the magnetization coil 51. Meanwhile, in portions of the magnetic path for the magnetization coil 51, which are distant from the first projections 37 and the second projections 38, magnetic flux is less likely to be concentrated at specific positions. Therefore, if the variable magnet 53 is arranged next to the magnetization coil 51 in the axial direction such that the magnetization coil 51 is located between the variable magnet 53 and the rotor 4 as described in the present embodiment, it is possible to suppress variation of the degree of magnetization of the variable magnet 53 in the circumferential direction.

(4) The first projections 37 and the second projections 38 are formed such that the area of the section of each first projection 37 and the area of the section of each second projection 38, the sections being perpendicular to the axial direction, are equal to each other. The first projections 37 and the second projections 38 serve as magnetic paths for magnetic flux produced by the supplementary field magnet SF. Therefore, even when only the sectional area of either one of each first projection 37 and each second projection 38 is increased, magnetic flux that is transmitted between the supplementary field magnet SF and the rotor 4 is not increased if the other one of each first projection 37 and each second projection 38 has a smaller sectional area and thus has large magnetic resistance. Therefore, by making the sectional area of each first projection 37 and the sectional area of each second projection 38 equal to each other as described in the present embodiment, it is possible to efficiently increase magnetic flux that is transmitted between the supplementary field magnet SF and the rotor 4.

(5) Because the rotor core 22 is formed by laminating the plurality of magnetic steel sheets 24 in the axial direction, it is possible to suppress generation of an eddy current. However, in the rotor core 22 that is formed by laminating the magnetic steel sheets 24 as described above, magnetic resistance in the axial direction is larger than magnetic resistance in the radial direction. Therefore, magnetic flux is less likely to flow thorough the rotor core 22 in the axial direction. Thus, for example, at positions in the rotor core 22, which are distant from the supplementary field magnet SF, the amount of magnetic flux from the supplementary field magnet SF may be small, or magnetic flux from portions of the embedded magnets 23, which are distant from the supplementary field magnet SF, may be less likely to be drawn into the supplementary field magnet SF. As a result, magnetic flux that is transmitted between the stator 3 and the rotor 4 may vary in the axial direction.

However, in the present embodiment, the first projections 37 are formed of the one end portions 43a of the elongate first magnetic bodies 43 that are inserted into the first insertion holes 41 formed in the first magnetic pole portions 35 and that have smaller magnetic resistance in the axial direction than the magnetic resistance of the rotor core 22 in the axial direction. Further, the second projections 38 are formed of the one end portions 44a of the elongate second magnetic bodies 44 that are inserted into the second insertion holes 42 formed in the second magnetic pole portions 36 and that have smaller magnetic resistance in the axial direction than the magnetic resistance of the rotor core 22 in the axial direction. Therefore, because magnetic flux passes through the elongate first magnetic bodies 43 and the elongate second magnetic bodies 44, the magnetic flux flows easily through the rotor core 22 in the axial direction. As a result, it is possible to suppress axial variation of magnetic flux that is transmitted between the stator 3 and the rotor 4.

(6) The embedded magnets 23 are each formed into a flat-plate shape, are arranged in the rotor core 22 in a radial fashion, and are magnetized such that the portions of the adjacent embedded magnets 23, which have the same polarity, face each other in the circumferential direction. Therefore, it is possible to form each of the first magnetic pole portions 35 and the second magnetic pole portions 36 into a shape that spreads over a wide range in the radial direction, and to make the area of each of the first magnetic pole portions 35 and the second magnetic pole portions 36 large as viewed from the axial direction. It is thus possible to increase sectional areas of the first projections 37 and the second projections 38, thereby effectively increasing or decreasing magnetic flux that is transmitted between the stator 3 and the rotor 4.

Next, a second embodiment of the invention will be described with reference to the accompanying drawings. The present embodiment and the foregoing first embodiment differ mainly in the structures of first projections and second projections. Therefore, for convenience of explanation, the same reference numerals will be used to refer to the same configurations as those in the first embodiment, and explanation thereof will be omitted.

Figure 5:
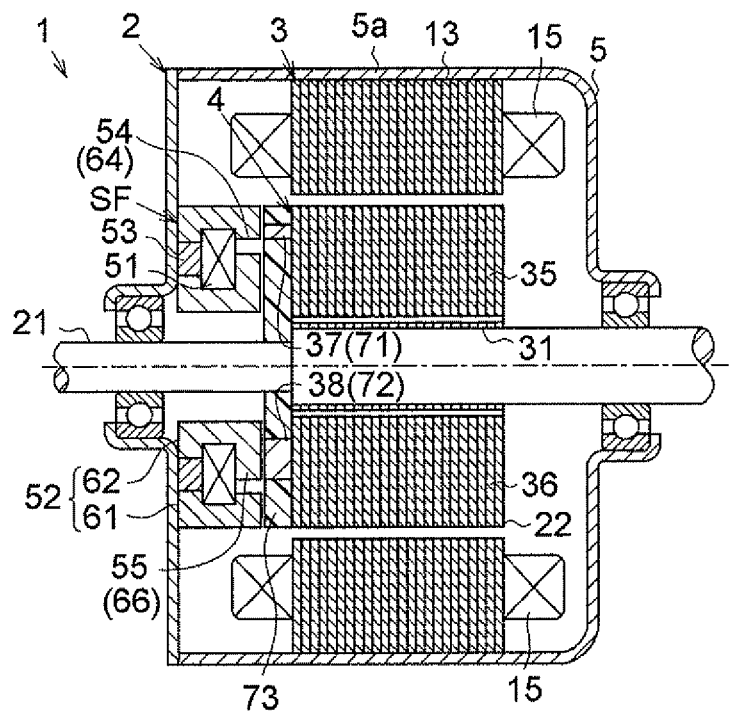
FIG. 5 is a sectional view of an electric motor according to a second embodiment of the invention, taken along the axial direction of the electric motor.
Figure 6:
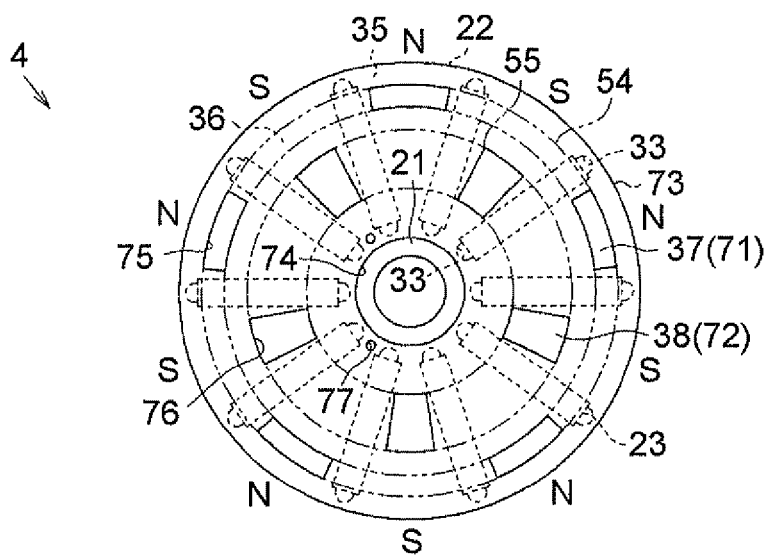
FIG. 6 is a side view of a rotor according to the second embodiment, seen from one axial end side of the electric motor.

As shown in FIG. 5 and FIG. 6, in one axial end face of each first magnetic pole portion 35, a short first magnetic body 71 is arranged at a position that is opposed to the outer magnetic pole portion 54 in the axial direction. In one axial end face of each second magnetic pole portion 36, a short second magnetic body 72 is arranged at a position that is opposed to the inner magnetic pole portion 55 in the axial direction. The first magnetic body 71 and the second magnetic body 72 in the present embodiment are each formed of a powder magnetic core. Shapes of sections of the first magnetic body 71 and the second magnetic body 72, the sections being perpendicular to the axial direction, are each formed into a generally sector shape, such that the sectional area of each first magnetic body 71 is substantially constant throughout the entirety of the first magnetic body 71 in the axial direction and the sectional area of each second magnetic body 72 is substantially constant throughout the entirety of the second magnetic body 72 in the axial direction. The first magnetic bodies 71 and the second magnetic bodies 72 are held by a holder 73 that is fixed to one axial end face of a rotor core 22. The holder 73 in the present embodiment is made of a resin material.

The holder 73 is formed into a disc shape, and a through-hole 74, through which a rotary shaft 21 is passed, is formed at the center of the holder 73. Fitting holes 75, 76, into which the first magnetic body 71 and the second magnetic body 72 are fitted, are formed in the holder 73 at positions corresponding to the first magnetic body 71 and the second magnetic body 72, respectively. The holder 73 is fixed to the rotor core 22 by an adhesive or the like. In the holder 73, multiple positioning holes 77 are formed at positions that are opposed to the voids 34 of the rotor 4, and the holder 73 is positioned easily with respect to the rotor core 22 by inserting pins (not shown), which have been inserted in the positioning holes 77, into the voids 34.

As in the first embodiment, in the electric motor 1 according to the present embodiment, polarities that appear in the outer magnetic pole portion 54 and the inner magnetic pole portion 55 are changed by changing the magnetization direction of the variable magnet 53. In addition, magnetic flux that is transmitted between the stator 3 and the rotor 4 is increased or decreased as magnetic flux produced by the supplementary field magnet SF enters or exits from the rotor 4 through the first projections 37 and the second projections 38.

As described above, according to the present embodiment, the following advantageous effects are obtained in addition to the effects (1) to (4) and (6) of the foregoing first embodiment.

(7) The first projections 37 are formed of the short first magnetic bodies 71 that are fixed to the positions on the one axial end faces of the first magnetic pole portions 35, the positions being opposed to the outer magnetic pole portion 54. The second projections 38 are formed of the short second magnetic bodies 72 that are fixed to the positions on one axial end faces of the second magnetic pole portions 36, the positions being opposed to the inner magnetic pole portion 55. Therefore, as compared to a case where insertion holes are formed in the first magnetic pole portions 35 and the second magnetic pole portions 36 and magnetic bodies are inserted in the insertion holes (for example, the foregoing first embodiment), it is possible to efficiently suppress an increase in magnetic resistance of the first magnetic pole portions 35 and the second magnetic pole portions 36 in the radial direction.

(8) The first magnetic bodies 71 and the second magnetic bodies 72 are fixed to the rotor core 22 by the holder 73.

Therefore, it is possible to make magnetic resistance between the first magnetic bodies 71 and the second magnetic bodies 72, and the rotor core 22 smaller than that in a case where the first magnetic bodies 71 and the second magnetic bodies 72 are fixed to the rotor core 22 with the use of, for example, an adhesive.

Next, a third embodiment of the invention will be described with reference to the accompanying drawings. The present embodiment and the foregoing first embodiment differ mainly in the structure of a supplementary field magnet. Therefore, for convenience of explanation, the same reference numerals will be used to refer to the same configurations as those in the first embodiment, and explanation thereof will be omitted.

Figure 7:
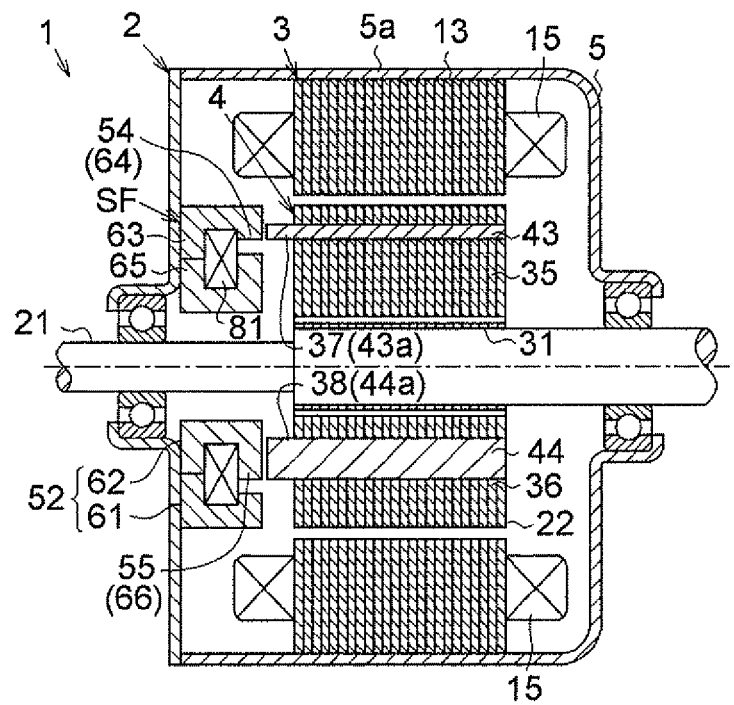
FIG. 7 is a sectional view of an electric motor according to a third embodiment of the invention, taken along the axial direction of the electric motor.

As shown in FIG. 7, a supplementary field magnet SF in the present embodiment includes a field coil 81 serving as a coil, and the yoke 52, and does not include a variable magnet 53. A conductive wire of the field coil 81 has substantially the same wire diameter as that of the conductive wire of stator coil 15. A fixed flange portion 63 of an outer member 61 and a fixed flange portion 65 of an inner member 62 of the yoke 52 are in close contact with each other.

Operations of the supplementary field magnet in the electric motor in the present embodiment will be described. In the present embodiment, polarities that appear in the outer magnetic pole portion 54 and the inner magnetic pole portion 55 are changed in accordance with the direction in which electric current is supplied to the field coil 81. An amount of increase (an amount of decrease) of magnetic flux that is transmitted between the stator 3 and the rotor 4 is adjusted in accordance with an amount of electric current that is supplied to the field coil 81. As in the foregoing first embodiment, magnetic flux that is transmitted between the stator 3 and the rotor 4 is increased or decreased as magnetic flux produced by the supplementary field magnet SF enters or exits from first projections 37 and the second projections 38.

As described above, according to the present embodiment, advantageous effects similar to the advantageous effects (1) and (4) to (6) of the foregoing first embodiment are obtained. Note that the foregoing embodiments may be modified as follows.

Figure 8A:
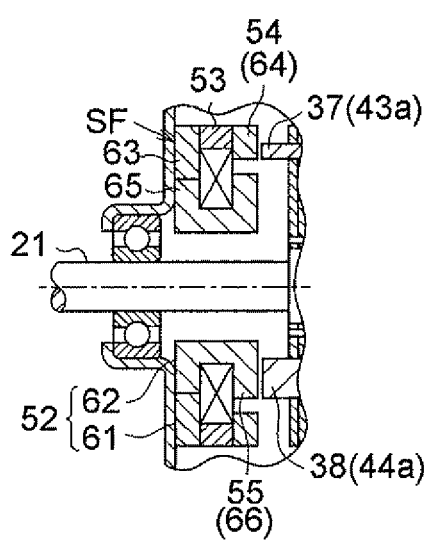
FIG. 8A and FIG. 8B are enlarged sectional views each showing the vicinities of supplementary field magnets according to other embodiments.
Figure 8B:
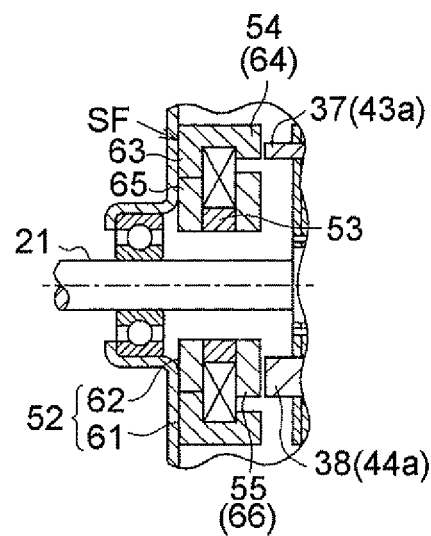

In the foregoing first and second embodiments, the magnetization coil 51 and the variable magnet 53 are arranged next to one another in the axial direction such that the magnetization coil 51 is located between the variable magnet 53 and the rotor 4. However, the invention is not limited to this configuration. For example, the variable magnet 53 may be fixed to an outer peripheral portion of the magnetization coil 51 as shown in FIG. 8A, or the variable magnet 53 may be fixed to an inner peripheral portion of the magnetization coil 51 as shown in FIG. 8B. Alternatively, the variable magnet 53 may be fixed to the yoke 52 so as to face the first projections 37 or the second projections 38. In this case, the variable magnet 53 is formed as the outer magnetic pole portion 54 or the inner magnetic pole portion 55.

Figure 9A:
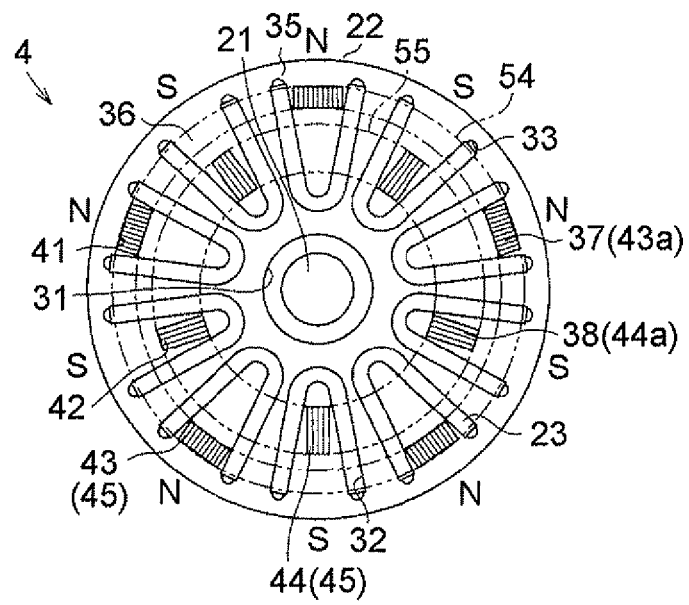
FIG. 9A and FIG. 9B are side views of rotors according to other embodiments, seen from one axial end side of an electric motor.

In the foregoing first embodiment, the plurality of flat-plate-shaped embedded magnets 23 are arranged in the rotor core 22 in a radial fashion. However, the invention is not limited to this configuration. For example, U-shaped embedded magnets 23, which are open toward the radially outer side, may be arranged in a circular manner as shown in FIG. 9A. In this case, inner regions of the embedded magnets 23, which are magnetized such that radially outer portions of the embedded magnets 23 has a first polarity, serve as first magnetic pole portions 35. Further, inner regions of the embedded magnets 23, which are magnetized such that the radially outer portions of the embedded magnets 23 has a second polarity, serve as second magnetic pole portions 36. First projections 37 and second projections 38 project from the first magnetic pole portions 35 and the second magnetic pole portions 36, respectively, toward one axial end side of the electric motor 1, and formed so as not to overlap each other in the circumferential direction.

Figure 9B:
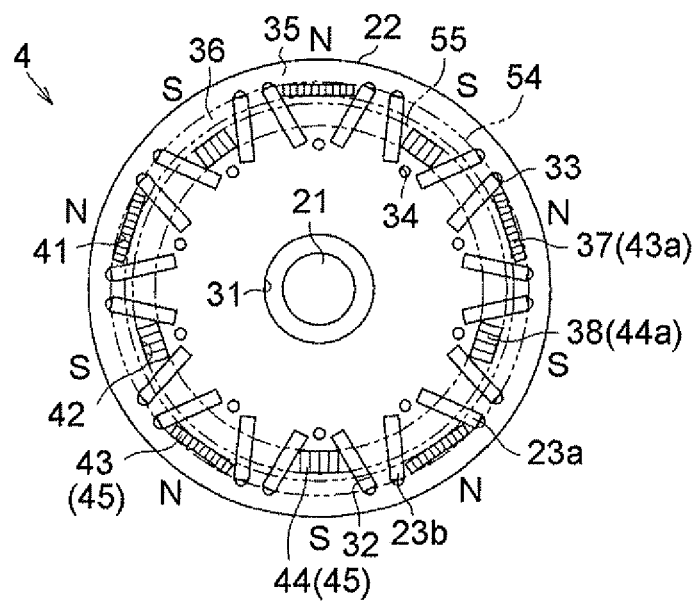

As shown in FIG. 9B, a plurality of pairs of embedded magnets 23a, 23b, which are magnetized such that portions having the same polarity faces each other in the circumferential direction, may be arranged in a circular manner. In this case, regions in the rotor core 22, which are between the embedded magnets 23a, 23b and in which the portions having the first magnetic pole faces each other, serve as first magnetic pole portions 35, and regions in the rotor core 22, which are between the embedded magnets 23a, 23b and in which the portions having second magnetic pole faces each other, serve as second magnetic pole portions 36. First projections 37 and second projections 38 project from the first magnetic pole portions 35 and the second magnetic pole portions 36, respectively, towards one axial end side of the electric motor 1, and formed so as not to overlap each other in the circumferential direction.

In short, for example, the shape and arrangement of the embedded magnets 23 may be changed as appropriate as long as the first projections 37 projecting from the first magnetic pole portions 35 and the second projections 38 projecting from the second magnetic pole portions 36 are provided so as not to overlap each other in the circumferential direction. Similarly, in the foregoing second and third embodiments, for example, the shape and arrangement of the embedded magnets 23 may be changed as appropriate.

In the foregoing first and third embodiments, the first magnetic bodies 43 and the second magnetic bodies 44 are each formed by laminating the magnetic steel sheets 45 in a direction perpendicular to the laminating direction of the magnetic steel sheets 24 that constitute the rotor core 22. However, as long as the first magnetic bodies 43 and the second magnetic bodies 44 each have smaller magnetic resistance in the axial direction than the magnetic resistance of the rotor core 22 in the axial direction, the first magnetic bodies 43 and the second magnetic bodies 44 may be formed of, for example, a powder magnetic core.

In the foregoing second embodiment, the first magnetic bodies 71 and the second magnetic bodies 72 are fixed to the rotor core 22 by the holder 73. However, the invention is not limited to this configuration, and the first magnetic bodies 71 and the second magnetic bodies 72 may be fixed to the rotor core 22 by, for example, an adhesive.

In each of the foregoing embodiments, each first projection 37 and each second projection 38 may be formed to have sectional areas different from each other.

In each of the foregoing embodiments, ferrite-based bonded magnets are used as the embedded magnets 23. However, the invention is not limited to this configuration, and, other magnets such as neodymium-based sintered magnets may be used as the embedded magnets 23. Similarly, as the variable magnet 53, a magnet other than a samarium-cobalt-based sintered magnet may be used.

In each of the foregoing embodiments, the rotor core 22 may be provided with the first projections 37 and the second projections 38 that project toward both axial sides of the electric motor 1 from the first magnetic pole portions 35 and the second magnetic pole portions 36, respectively, and, the supplementary field magnet SF may be provided on each of both axial sides of the rotor 4.

In each of the foregoing embodiments, the first polarity may be the south pole, and the second polarity may be the north pole.

In each of the foregoing embodiments, the outer member 61 and the inner member 62, and the first magnetic bodies 71 and the second magnetic bodies 72 are each formed of a powder magnetic core. However, low carbon steel, for example, may also be used to form these portions.

In each of the foregoing embodiments, the invention is applied to the electric motor 1 that is used as a drive source for an electric vehicle and a hybrid vehicle. However, application of the invention is not limited to this, and the invention may be applied to a drive source for other devices such as an electric power steering system, or may be applied to a generator. An electric motor, in which magnetic flux of the supplementary field magnet SF is generated by the variable magnet 53 as in the foregoing first and third embodiments, is preferably applied to a usage in which a state in which high torque is output or a state in which a rotational speed is high continues. Further, an electric motor, in which magnetic flux of the supplementary field magnet SF is generated by the field coil 81 as in the foregoing second embodiment, is preferably applied to a usage in which the state frequently switches between a state in which high torque is output and a state in which a rotational speed is high.

What is claimed is:

1. An electric motor, comprising:
a housing having a tubular portion;
a stator fixed to an inner periphery of the tubular portion; and
a rotor arranged radially inward of the stator, and having a rotor core and a plurality of embedded magnets that are embedded in the rotor core so as to be fixed to the rotor core, the embedded magnets being arranged such that a magnetic pole with a first polarity and a magnetic pole with a second polarity are arranged alternately in a circumferential direction on an outer periphery of the rotor, wherein
the rotor core is provided with a first projection that projects toward at least one axial side of the electric motor from a first magnetic pole portion of the rotor core, in which the magnetic pole with the first polarity appears in the outer periphery, and a second projection that projects toward at least one axial side of the electric motor from a second magnetic pole portion of the rotor core, in which the magnetic pole with the second polarity appears in the outer periphery, the second projection being arranged radially inward of the first projection,
on at least one axial side of the rotor, a supplementary field magnet is arranged, which has a coil that is wound in the circumferential direction, and a yoke that serves as a magnetic path for magnetic flux produced by the coil,
the supplementary field magnet includes an outer magnetic pole portion that faces the first projection in an axial direction, and an inner magnetic pole portion that faces the second projection in the axial direction such that a gap is formed between the inner magnetic pole portion and the outer magnetic pole portion,
the supplementary field magnet includes a variable magnet that is provided in an intermediate portion of the magnetic path for magnetic flux produced by the coil, and is magnetized along the magnetic flux.

2. The electric motor according to claim 1, wherein the variable magnet is formed into an annular shape, and is arranged next to the coil in the axial direction such that the coil is located between the variable magnet and the rotor.

3. An electric motor, comprising:
a housing having a tubular portion;
a stator fixed to an inner periphery of the tubular portion; and
a rotor arranged radially inward of the stator, and having a rotor core and a plurality of embedded magnets that are embedded in the rotor core so as to be fixed to the rotor core, the embedded magnets being arranged such that a magnetic pole with a first polarity and a magnetic pole with a second polarity are arranged alternately in a circumferential direction on an outer periphery of the rotor, wherein
the rotor core is provided with a first projection that projects toward at least one axial side of the electric motor from a first magnetic pole portion of the rotor core, in which the magnetic pole with the first polarity appears in the outer periphery, and a second projection that projects toward at least one axial side of the electric motor from a second magnetic pole portion of the rotor core, in which the magnetic pole with the second polarity appears in the outer periphery, the second projection being arranged radially inward of the first projection;
on at least one axial side of the rotor, a supplementary field magnet is arranged, which has a coil that is wound in the circumferential direction, and a yoke that serves as a magnetic path for magnetic flux produced by the coil;
the supplementary field magnet includes an outer magnetic pole portion that faces the first projection in an axial direction, and an inner magnetic pole portion that faces the second projection in the axial direction such that a gap is formed between the inner magnetic pole portion and the outer magnetic pole portion;
the rotor core is formed by laminating a plurality of magnetic steel sheets in the axial direction;
a first insertion hole, which is open toward at least one axial side, is formed in the first magnetic pole portion at a position that is opposed to the outer magnetic pole portion, and a second insertion hole, which is open toward at least one axial side, is formed in the second magnetic pole portion at a position that is opposed to the inner magnetic pole portion;
the first projection is formed of an elongate first magnetic body that is inserted into the first insertion hole, and has smaller magnetic resistance in the axial direction than magnetic resistance of the rotor core in the axial direction; and
the second projection is formed of an elongate second magnetic body that is inserted into the second insertion hole, and has smaller magnetic resistance in the axial direction than magnetic resistance of the rotor core in the axial direction.

* * * * *